(12) United States Patent
Ive et al.

(10) Patent No.: US 6,363,759 B1
(45) Date of Patent: Apr. 2, 2002

(54) ROTATABLE DOOR LOCK WITH INTEGRATED SECURITY FEATURE

(75) Inventors: Jonathan Ive; Daniele de Iuliis, both of San Francisco, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/411,310

(22) Filed: Oct. 4, 1999

(51) Int. Cl.[7] .............................................. E05B 73/00
(52) U.S. Cl. ............................ 70/58; 70/164; 292/205; 292/207; 292/208
(58) Field of Search ................................ 70/18, 49, 58, 70/164, DIG. 57; 292/205, 207, 208

(56) References Cited

U.S. PATENT DOCUMENTS

| | | | | |
|---|---|---|---|---|
| 412,939 A | * | 10/1889 | Wands ..................... | 292/205 X |
| 739,640 A | * | 9/1903 | Beehler ................... | 292/205 X |
| 968,024 A | * | 8/1910 | Beehler .................... | 292/205 |
| 974,430 A | * | 11/1910 | Rank ......................... | 292/205 |
| 987,783 A | * | 3/1911 | Williams ................... | 292/205 |
| 3,413,830 A | * | 12/1968 | Rifkin ..................... | 292/207 X |
| 3,515,423 A | * | 6/1970 | De Smidt ................ | 292/205 X |
| 4,326,396 A | * | 4/1982 | Steinbach .................... | 70/492 |
| 4,331,012 A | * | 5/1982 | Swisher ....................... | 70/164 |
| 4,395,893 A | * | 8/1983 | Steinbach .................... | 70/492 |
| 4,414,829 A | * | 11/1983 | Nielsen, Jr. et al. ... | 70/DIG. 57 X |
| 4,676,534 A | * | 6/1987 | Hix, Jr. ...................... | 292/205 |
| 4,768,816 A | * | 9/1988 | Bakula .................... | 292/205 X |
| 5,495,389 A | * | 2/1996 | Dewitt et al. ............... | 70/58 X |
| 5,735,152 A | * | 4/1998 | Dietz et al. ............... | 70/276 X |
| 6,105,922 A | * | 8/2000 | Derman ...................... | 70/58 X |
| 6,112,562 A | * | 9/2000 | Murray, Jr. et al. ............ | 70/58 |
| 6,263,712 B1 | * | 7/2001 | Ramsauer .................... | 70/208 |

FOREIGN PATENT DOCUMENTS

| | | | | |
|---|---|---|---|---|
| DE | 191063 | * | 10/1907 | .................. 292/205 |
| FR | 377406 | * | 7/1907 | .................. 292/205 |

* cited by examiner

*Primary Examiner*—Lloyd A. Gall
(74) *Attorney, Agent, or Firm*—Burns, Doane, Swecker & Mathis, L.L.P.

(57) ABSTRACT

Rotatable door lock with an integrated security feature is used in a housing having a lockable door panel. The housing has an opening therein. The lockable door panel includes a lock cylinder having a passage extending substantially radially therethrough. The lockable door panel further includes a door panel of sufficient size to cover the opening, the door panel having a door panel opening therein for receiving the lock cylinder, and at least one door panel recess in an outside of the door panel and leading to the door panel opening such that, when the lock cylinder is turned to a locking position relative to the door panel, the passageway is accessible through the at least one door panel recess. When the door panel is moved to a closed position to cover the opening, the lock cylinder in the door panel is received in the opening and is turnable to the locking position to lock the lockable door panel to the housing. A further locking element removably extends through the at least one door panel recess and the passageway.

13 Claims, 4 Drawing Sheets

ROTATABLE DOOR LOCK WITH INTEGRATED SECURITY FEATURE

FIELD OF THE INVENTION

The present invention relates generally to locking arrangements and, more particularly, to locking arrangements including rotatable lock cylinders.

BACKGROUND AND SUMMARY

It is common to provide locking arrangements on doors to prevent the doors from being inadvertently being opened. Locking arrangements that use rotating lock cylinders are also well known. Various complex mechanisms are known to prevent unauthorized opening of doors locked by locking arrangements. It is desirable to provide a locking arrangement that offers a simple and effective means of preventing unauthorized opening of doors.

Prevention of unauthorized access to the interior of the housing of a personal computer is often desirable. To minimize the cost of the personal computer, it is desirable to minimize the cost of components such as access panels and any locking arrangements associated with the access panels. Often, however, the only available locking arrangements are either relatively expensive or complex or are relatively ineffective at preventing access to the interior of the housing. It is desirable to provide a locking arrangement that effectively prevents unauthorized access to the interior of a housing of a computer, is simple in operation, and can be made inexpensively.

Devices such as personal computers are often the subject of theft. It is desirable to provide a theft deterrent feature for devices such as personal computers.

The present invention permits satisfaction of some or all of the foregoing desirable features for locking arrangements and devices such as personal computers.

In accordance with one aspect of the present invention, a housing having a lockable door panel includes a housing having a first opening and a second opening therein, the second opening being spaced from the first opening, the second opening being defined by a wall having a first end and including a generally circular central portion and two elongated side portions extending radially from substantially opposite sides of the central portion, at least one locking recess extending radially from the central portion beneath at least part of the wall. The housing having a lockable door panel further includes a lockable door panel. The lockable door panel includes a lock cylinder including a generally circularly cylindrical body having a first end and a second end, one or more members extending radially from proximate the first end of the body, and a passageway extending substantially radially through the body between the first end and the second end. The lockable door panel further includes a door panel of sufficient size to cover the first opening and the second opening. The door panel has a generally circularly cylindrical door panel opening therein for receiving the lock cylinder. The door panel opening is defined by an inner wall extending from an inside of the door panel at a first end thereof to an outside of the door panel at a second end thereof, and receives the lock cylinder such that the second end is disposed proximate the second end of the inner wall and the one or more members are disposed longitudinally beyond the first end of the inner wall. The door panel further includes two door panel recesses in the outside of the door panel leading to the opening such that, when the lock cylinder is turned to a locking position relative to the door panel, the passageway is accessible through both of the door panel recesses. The door panel recesses define protrusions on the inner wall of the door panel. When the lockable door panel is moved to a closed position to cover the first opening and the second opening, the lock cylinder is received in the central portion of the second opening and the protrusions defined by the door panel recesses are received in the elongated portions of the second opening, and when the lock cylinder is turned to the locking position, the at least one member is received in the locking recess.

In accordance with another aspect of the present invention, a lockable door panel includes a lock cylinder including a generally circularly cylindrical body having a first end and a second end, at least one member extending radially from proximate the first end of the body, and a passageway extending substantially radially through the body between the first end and the second end. The lockable door panel further includes a door panel, the door panel having a generally circularly cylindrical opening therein for receiving the lock cylinder. The opening is defined by an inner wall extending from an inside of the door panel at a first end thereof to an outside of the door panel at a second end thereof, and receives the lock cylinder such that the second end is disposed proximate the second end of the inner wall and the at least one member is disposed longitudinally beyond the first end of the inner wall. The door panel further includes two recesses in the outside of the door panel leading to the opening such that, when the lock cylinder is turned to a locking position relative to the door panel, the passageway is accessible through both of the recesses.

In accordance with yet another aspect of the present invention, a lock cylinder includes a generally circularly cylindrical body having a first end and a second end, at least one member extending radially from proximate the first end of the body, and a passageway extending substantially radially through the body between the first end and the second end.

In accordance with still another aspect of the present invention, a housing having a lockable door panel includes a housing having an opening therein. The housing having a lockable door panel further includes a lockable door panel. The lockable door panel includes a lock cylinder having a passage extending substantially radially therethrough, and a door panel of sufficient size to cover the opening, the door panel having a door panel opening therein for receiving the lock cylinder, and at least one door panel recess in an outside of the door panel and leading to the door panel opening such that, when the lock cylinder is turned to a locking position relative to the door panel, the passageway is accessible through the at least one door panel recess. When the door panel is moved to a closed position to cover the opening, the lock cylinder in the door panel is received in the opening and is turnable to the locking position to lock the lockable door panel to the housing.

In accordance with still another aspect of the present invention, a lock cylinder includes a generally circularly cylindrical body having a first end and a second end, and a passageway extending substantially radially through the body between the first end and the second end.

BRIEF DESCRIPTION OF THE DRAWINGS

The features and advantages of the present invention are well understood by reading the following detailed description in conjunction with the drawings in which like numerals indicate similar elements and in which.

Detailed Description

Figure 1:
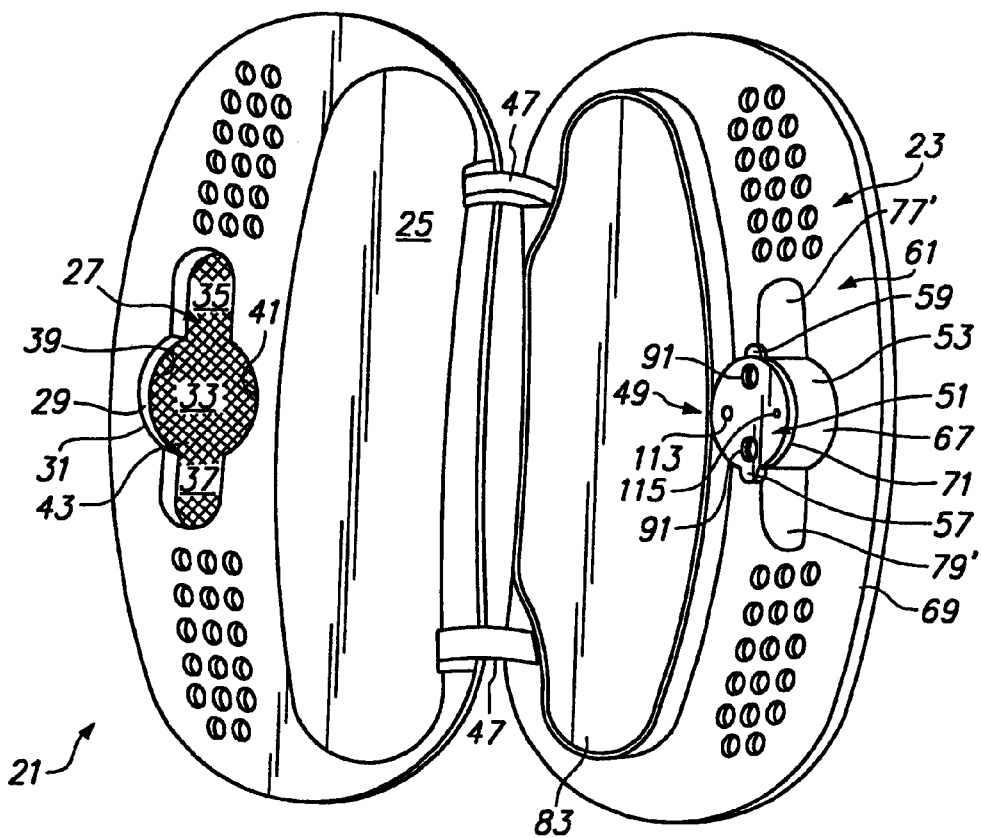
FIG. 1 is a perspective view of a portion of a housing showing a lockable door panel in an open condition according to an embodiment of the present invention.
Figure 2:
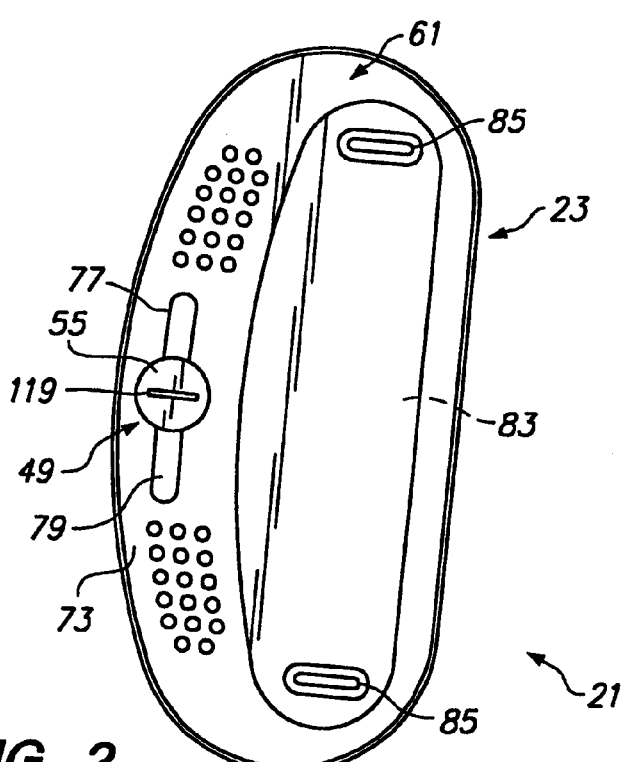
FIG. 2 is a perspective view of a portion of a housing showing a lockable door panel in a closed condition according to an embodiment of the present invention.

A housing 21 having a lockable door panel 23 is shown with the door panel in an open condition in FIG. 1 and with the door panel in a closed condition in FIG. 2. According to a preferred embodiment, the housing 21 is a housing for a personal computer, however, it will be apparent that the present invention is applicable to any number of structures having openable and closable doors.

As seen in FIG. 1, the housing 21 preferably has a first opening 25 and a second opening 27 therein. The second opening 27 is preferably spaced from the first opening 25, although the first and second openings may be connected by an intermediate opening or recess, as desired or necessary. The second opening 27 is defined by a wall 29 having a first end 31 and includes a generally circular central portion 33 and two elongated side portions 35 and 37 extending radially from substantially opposite sides of the central portion. The wall 29 of the second opening 27 may have a second end that forms at least one, and preferably two locking recesses 39 and 41 extending radially from the central portion beneath the wall. If desired or necessary, the locking recesses may extend into the wall instead of being formed by a second end of the wall. When the housing 21 is part of a personal computer, it will generally be desirable to provide some form of shielding structure 43 in the bottom of the second opening 27 to close the second opening to the housing, but below the locking recesses 39 and 41, and the first opening 25 will permit access to the interior of the housing.

The lockable door panel 23 is preferably attached by hinges 47 to the housing 21. If desired or necessary, no hinges may be provided, and the lockable door panel 23 may be removably attached to the housing by a locking arrangement on the lockable door panel, either alone or in combination with other structures such as pins and holes and the like.

Figure 3:
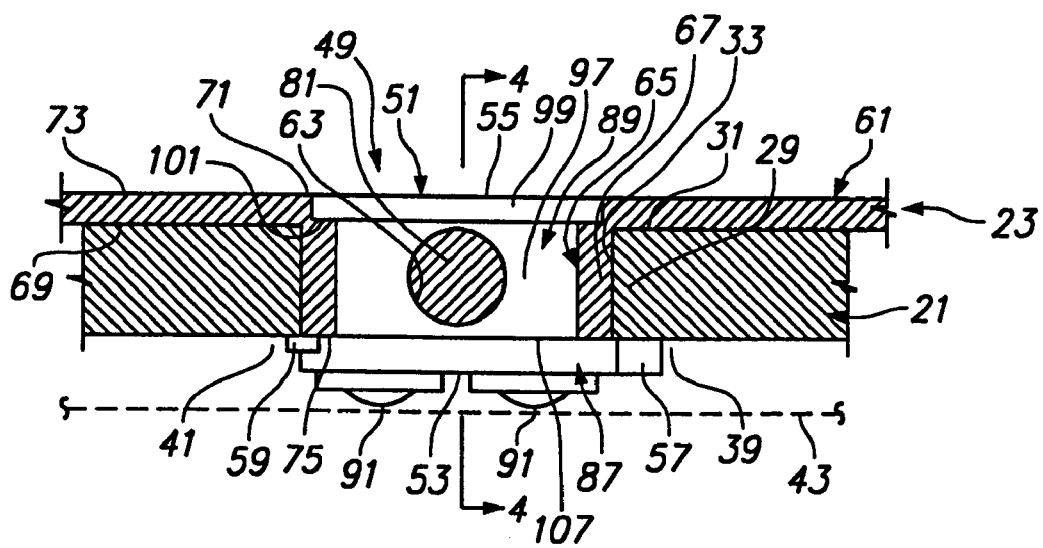
FIG. 3 is a partially cross-sectional side view of a portion of a housing and a lockable door panel according to an embodiment of the present invention.
Figure 4:
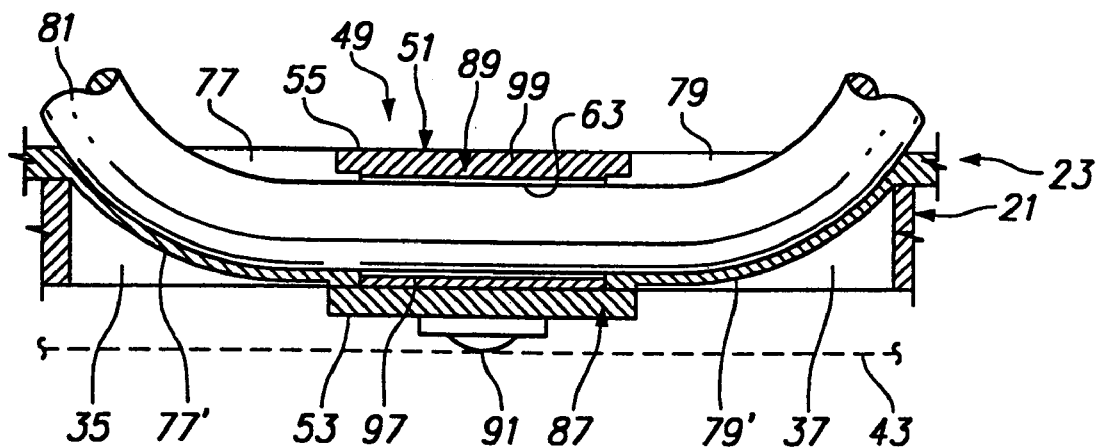
FIG. 4 is a partially cross-sectional side view of a portion of a housing and a lockable door panel taken at section 4—4 of FIG. 3.

The lockable door panel 23 includes a lock cylinder 49 including a generally circularly cylindrical body 51 having a first end 53 (FIG. 1) and a second end 55 (FIG. 2). As seen in FIG. 1, one or more, preferably two members, preferably flanges 57 and 59, extend radially from proximate the first end 53 of the body. As seen in FIG. 3, the flanges 57 and 59 are received in the locking recesses 39 and 41, respectively, when the lock cylinder 49 is turned relative to a door panel 61 of the lockable door panel 23 to lock the lockable door panel in a closed position relative to the housing 21. As seen in FIGS. 3 and 4, passageway 63 extends substantially radially through the body 51 between the first end 53 and the second end 55.

Figure 5:
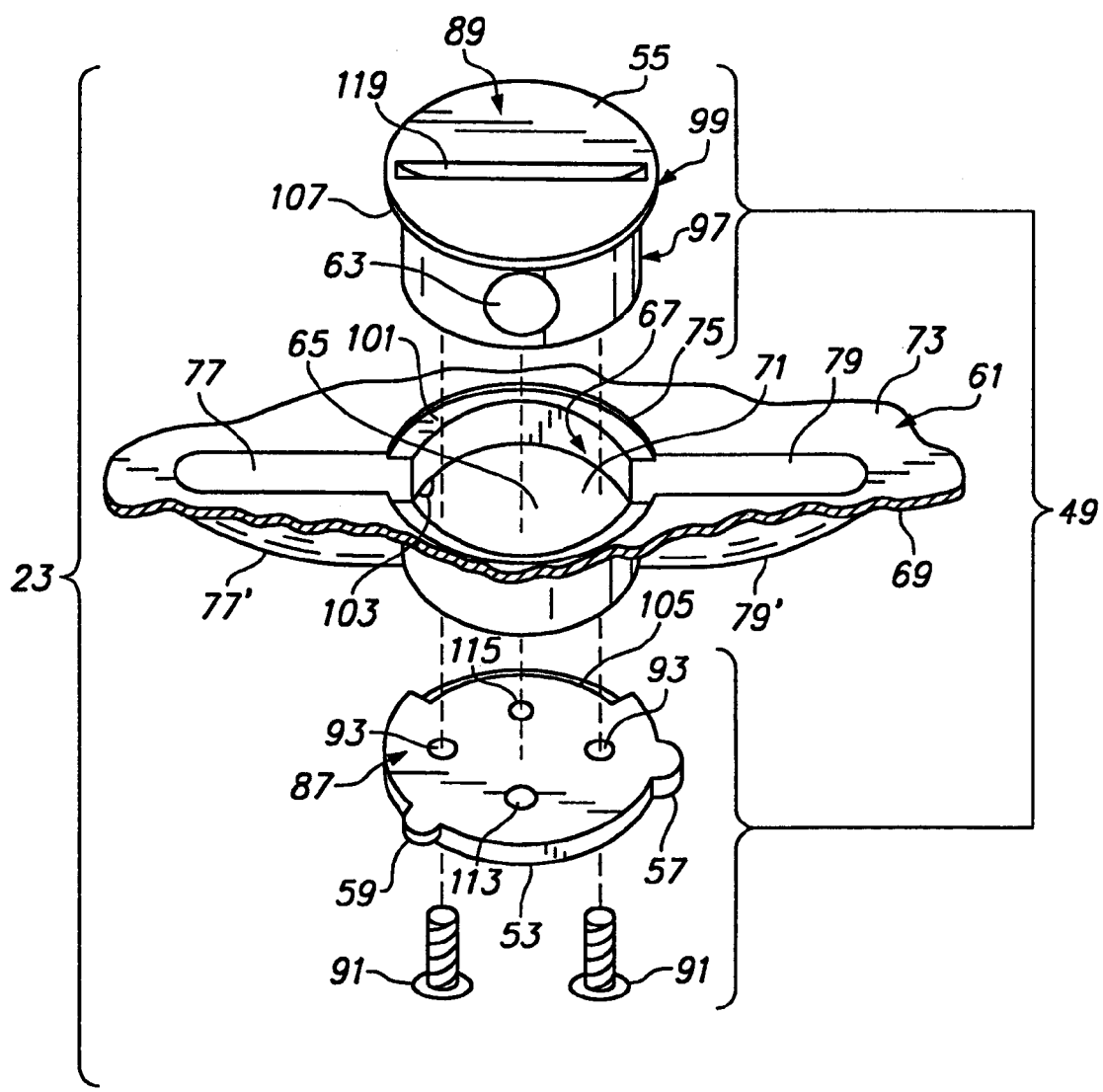
FIG. 5 is an exploded, perspective top view of a portion of a lockable door panel according to an embodiment of the present invention.

As seen in FIG. 2, the door panel 61 is of sufficient size to cover the first opening 25 and the second opening 27. As seen in FIGS. 4 and 5, the door panel 61 has a generally circularly cylindrical opening 65 therein for receiving the lock cylinder 49. The door panel opening 65 is defined by an inner wall 67 extending from an inside 69 of the door panel at a first end 71 of the inner wall to an outside 73 of the door panel at a second end 75 of the inner wall. As seen in FIGS. 3 and 4, the door panel opening 65 receives the lock cylinder 49 such that the second end 55 of the lock cylinder is disposed proximate the second end 75 of the inner wall and tie flanges 57 and 59 are disposed longitudinally beyond the first end 53 of the inner wall.

As seen in FIGS. 4 and 5, the door panel 61 also includes two door panel recesses 77 and 79 in the outside 73 of the door panel leading to the opening 65 such that, when the lock cylinder 49 is turned to a locking position relative to the door panel, the passageway 63 is accessible through both of the door panel recesses. When the passageway 63 and the door panel recesses 77 and 79 are aligned in this manner, an elongated locking element 81 as seen in FIG. 4, such as a cable or bar, is inserted through the passageway and the recesses, thereby preventing turning of the locking element 49 relative to the door panel 61. The locking element 81 may, in turn, be fixed to some other object to deter theft of the housing in a manner similar to the manner in which certain cable or rod-type bicycle locks deter theft of bicycles by locking them to other objects.

Figure 6:
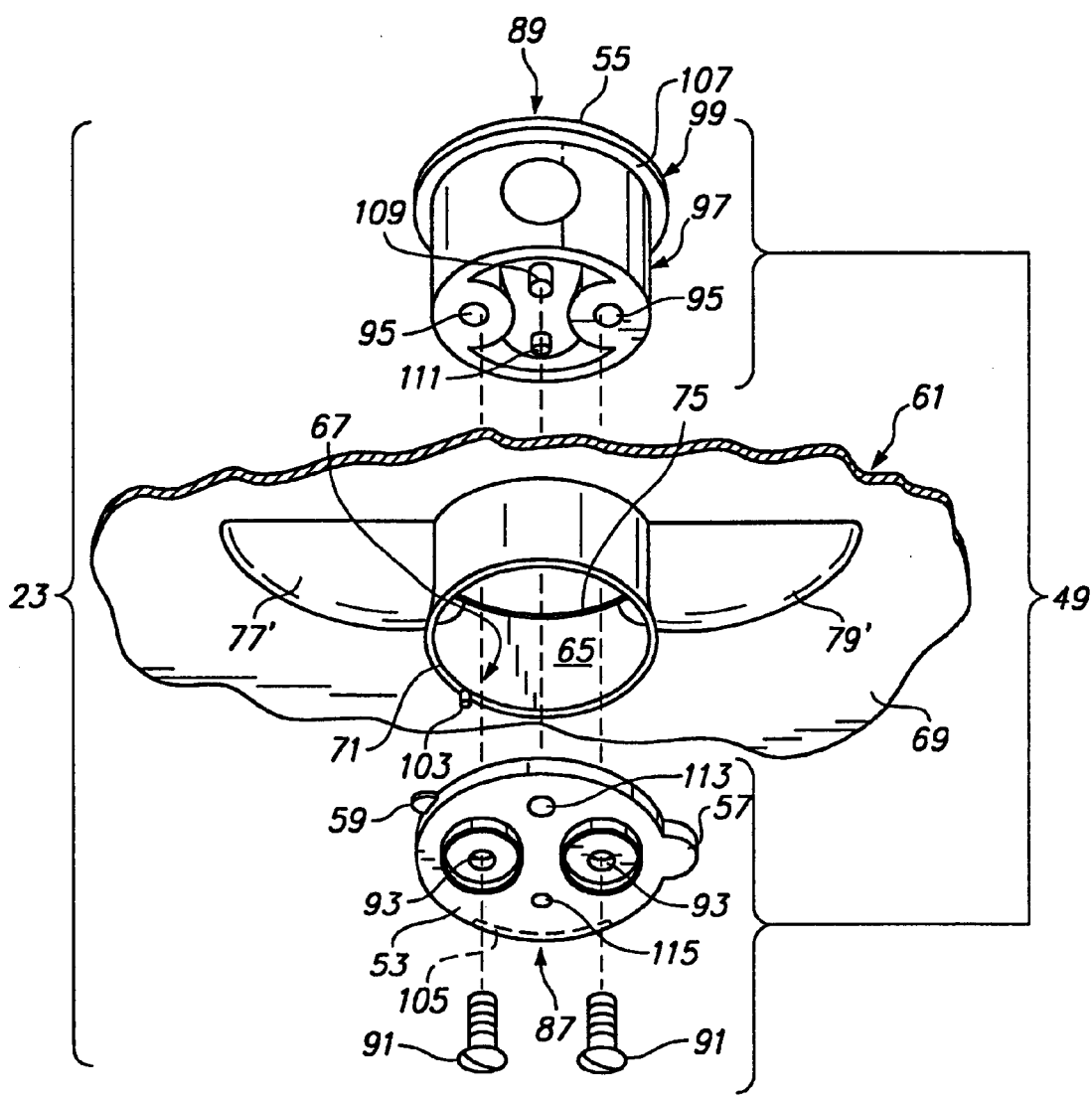
FIG. 6 is an exploded, perspective bottom view of a portion of a lockable door panel according to an embodiment of the present invention.

The door panel recesses 77 and 79 seen in FIG. 5 define protrusions 77' and 79' seen in FIG. 6, respectively, on the inside 69 of the door panel 61. As seen in FIGS. 3 and 4, when the door panel 61 is moved to a closed position to cover the first opening (not shown in FIGS. 3 and 4) and the second opening 27, the lock cylinder 49 in the door panel is received in the central portion 33 (FIG. 3) of the second opening and the protrusions 77' and 79' defined by the door panel recesses 77 and 79 are received in the elongated portions 35 and 37 of the second opening. When the lock cylinder 49 is turned to the locking position, the flanges 57 and 59 are received in the locking recesses 39 and 41.

When the housing 21 is for a personal computer or other electronic equipment sensitive to EMI or RFI interference, the lockable door panel 23 is preferably also formed of or provided with shielding material. As seen in FIG. 1, shielding material 83, such as a metallic plate or sheet, is preferably attached to a lockable door panel 23, which can be made of plastic. The lockable door panel 23 is preferably provided with recesses 85, as seen in FIG. 2, into which the shielding material 83 may be partially compressed to assist in securing the shielding material to the lockable door panel. The shielding material 83 is preferably further secured to the lockable door panel by adhesives and/or welds or mechanical fasteners such as rivets.

As seen in FIGS. 3–6, the body 51 of the lock cylinder 49 preferably includes a first part 87 and a second part 89 that are secured together, the first part including the first end 53 of the body and the second part including the second end 55 of the body. As seen in FIGS. 5 and 6, the first part 87 and the second part 89 are preferably secured together by screws 91 extending through holes 93 in the first part and into internally threaded holes 95 (FIG. 6) in the second part.

The second part 89 preferably includes a first generally circularly cylindrical portion 97 and a second generally circularly cylindrical portion 99. The second portion 99 preferably has a larger diameter than the first portion 97 and includes the second end 55 of the body 51. The body 51 of the lock cylinder 49 preferably fits into the opening 65 in the door panel 61 only up to the second portion 99 or, more preferably, the opening is provided with a ledge 101 so that the second portion fits into the opening only up to the point at which the second portion abuts the ledge. By providing the larger diameter second portion 99, the lock cylinder 49 is prevented from being forced entirely through the opening 65.

The first part 87 of the body 51 of the lock cylinder 49 is preferably of a larger diameter than the second portion 99 of the second part 89 and larger in diameter than the opening 65 to provide greater protection against axial withdrawal of the lock cylinder from the opening than is provided by the flanges 57 and 59 alone. When the first part 87 is secured to the second part 89, the lock cylinder 49 is preferably not axially movable in the opening 65.

The flanges 57 and 59 may, if desired or necessary, be disposed at substantially 180° to each other, or at any angle desired. In the presently preferred embodiment, the flanges 57 and 59 are disposed at approximately 170° to each other and are of unequal size to avoid contacting other components of the housing with the flanges.

The first end 71 of the wall 67 of the opening 65 in the door panel 61 is preferably provided with a protrusion 103 and the first part 87 of the body 51 of the lock cylinder 49 is preferably provided with a recess 105 in which the protrusion is receivable. The recess 105 preferably describes a 90° arc on the first part 87 so that, when the lock cylinder 49 is turned in the opening 65, it is only able to turn through a 90° angle. If desired or necessary, the first part 87 can be provided with the protrusion and the first end 71 of the wall 67 of the opening 65 can be provided with a recess to accomplish the same result. If it is desired that the lock cylinder 49 turn through some larger or smaller angle, the arc of the recess can be made larger or smaller, as necessary.

The first end 107 of the second portion 99 of the second part 89 of the body 51 of the lock cylinder 49 is preferably provided with one or more, preferably two pins 109 and 111 that mate with corresponding holes 113 and 115 in the first part 87 of the body of the lock cylinder. The pins 109 and 111 and holes 113 and 115 facilitate proper orientation of the first part 87 relative to the second part 89 during assembly of the lockable door panel 23. To further facilitate proper orientation of the first part 87 relative to the second part 89, the pins 109 and 111 are preferably of different sizes so that the pin 109 can only be received in the hole 113 and the pin 111 can only be received in the hole 115. If desired or necessary, the pins can be provided on the first part 87 and the corresponding holes can be provided on the first end 107 of the second portion 99 of the second part 89 of the body.

As seen with reference to FIGS. 5 and 6, the lockable door panel 23 is preferably assembled by inserting the first portion 97 of the second part 89 of the body 51 of the lock cylinder 49 into the opening 65 of the door panel 61 from the outside 73 of the door panel until the second portion 99 abuts against the outside of the door panel or against the ledge 101 in the opening, depending upon how the opening is structured. The first part 87 of the body 51 is aligned with the second part from the inside 69 of the door panel 61 by causing the pins 109 and 111 extending from the first end 107 of the second portion 99 of the second part 89 of the body 51 to mate with the corresponding holes 113 and 115 in the first part 87 of the body. The first part 87 and the second part 89 are then secured together by the screws 91.

When the lockable door panel 23 is positioned over the first and second openings 25 and 27 in the housing 21 so that the lock cylinder 49 disposed in the cylindrical opening 65 is received in the central portion 33 of the second opening and the protrusions 77' and 79' formed by the door panel recesses 77 and 79 are disposed in the elongated side portions 35 and 37 of the second opening, the lockable door panel is locked to the housing by turning the lock cylinder to the locked position in which the flanges 57 and 59 are received in the locking recesses 39 and 41. The second end 55 of the body 51 of the lock cylinder 49 is preferably provided with a key opening 119 to facilitate turning of the lock cylinder by a key (not shown). The key opening 119 is preferably in the form of a slot so that the lock cylinder is turnable by a key such as a screwdriver or a coin.

When the lock cylinder 49 is turned to the locked position, the passageway 63 is preferably aligned with the door panel recesses 77 and 79. The elongated locking element 81 is then preferably inserted into one of the door panel recesses 77 and 79, through the passageway 63, and out the other one of the door panel recesses, thereby preventing rotation of the lock cylinder 49 relative to the door panel 61. The elongated locking element 81 may then be further locked to another object (not shown).

While this invention has been illustrated and described in accordance with a preferred embodiment, it is recognized that variations and changes may be made therein without departing from the invention as set forth in the claims.

What is claimed is:

1. A housing having a lockable door panel, comprising:

a housing having a first opening and a second opening therein, the second opening being spaced from the first opening, the second opening being defined by a wall having a first end and including a generally circular central portion and two elongated side portions extending radially from substantially opposite sides of the central portion, at least one locking recess extending radially from the central portion beneath at least part of the wall; and a lockable door panel, the lockable door panel including a lock cylinder including a generally circularly cylindrical body having a first end and a second end, one or more members extending radially from proximate the first end of the body, and a passageway extending substantially radially through the body between the first end and the second end, and a door panel of sufficient size to cover the first opening and the second opening, the door panel having a generally circularly cylindrical door panel opening therein for receiving the lock cylinder, the door panel opening being defined by an inner wall extending from an inside of the door panel at a first end thereof to an outside of the door panel at a second end thereof, and receiving the lock cylinder such that the second end is disposed proximate the second end of the inner wall and the one or more members are disposed longitudinally beyond the first end of the inner wall, and two door panel recesses in the outside of the door panel leading to the opening such that, when the lock cylinder is turned to a locking position relative to the door panel, the passageway is accessible through both of the door panel recesses, the door panel recesses defining protrusions on the inner wall of the door panel, wherein, when the lockable door panel is moved to a closed position to cover the first opening and the second opening, the lock cylinder is received in the central portion of the second opening and the protrusions defined by the door panel recesses are received in the elongated portions of the second opening, and when the lock cylinder is turned to the locking position, the at least one member is received in the at least one locking recess.

2. The housing as set forth in claim 1, wherein the lockable door panel is attached to the housing by one or more hinges.

3. The housing as set forth in claim 1, wherein the door panel further includes an electromagnetic shield for covering the first opening.

4. The housing as set forth in claim 1, wherein the second opening is closed to the housing at an inner end thereof.

5. The housing as set forth in claim 1, further comprising an elongated locking element removably extending through the door panel recesses and the passageway.

6. A lockable door panel, comprising:
   a lock cylinder including a generally circularly cylindrical body having a first end and a second end, at least one member extending radially from proximate the first end of the body, and a passageway extending substantially radially through the body between the first end and the second end; and
   a door panel, the door panel having a generally circularly cylindrical opening therein for receiving the lock cylinder, the opening being defined by an inner wall extending from an inside of the door panel at a first end thereof to an outside of the door panel at a second end thereof, and receiving the lock cylinder such that the second end is disposed proximate the second end of the inner wall and the at least one member is disposed longitudinally beyond the first end of the inner wall, and two recesses in the outside of the door panel leading to the opening such that, when the lock cylinder is turned to a locking position relative to the door panel, the passageway is accessible through both of the recesses.

7. The lockable door panel according to claim 6, wherein the door panel includes an electromagnetic shield.

8. The lockable door panel according to claim 6, further comprising an elongated locking element removably extending through the door panel recesses and the passageway.

9. A housing having a lockable door panel, comprising:
   a housing having an opening therein; and
   a lockable door panel, the lockable door panel including
      a lock cylinder having a passage extending substantially radially therethrough,
      a door panel of sufficient size to cover the opening, the door panel having a door panel opening therein for receiving the lock cylinder, and at least one door panel recess in an outside of the door panel and leading to the door panel opening such that, when the lock cylinder is turned to a locking position relative to the door panel, the passageway is accessible through the at least one door panel recess,
   wherein, when the door panel is moved to a closed position to cover the opening, the lock cylinder in the door panel is received in the opening and is turnable to the locking position to lock the lockable door panel to the housing.

10. The housing as set forth in claim 9, wherein the lockable door panel is attached to the housing by one or more hinges.

11. The housing as set forth in claim 9, wherein the door panel further includes an electromagnetic shield for covering the opening.

12. The housing as set forth in claim 9, wherein the opening is at least partially closed to the housing at an inner end thereof.

13. The housing as set forth in claim 9, Further comprising an elongated locking element removably extending through the at least one door panel recess and the passageway.

\* \* \* \* \*